(12) United States Patent
Borchert et al.

(10) Patent No.: US 9,023,264 B2
(45) Date of Patent: May 5, 2015

(54) METHOD FOR PRODUCING A CONTAINER OF THERMOPLASTIC MATERIAL

(75) Inventors: Matthias Borchert, Bonn (DE); Timo Kramer, Hirz-Maulsbach (DE); Klaus Gebert, Willich (DE); Dirk Eulitz, Bonn (DE); Gerd Wolter, Konigswinter (DE); Harald Lorenz, Bad Neuenahr-Ahrweiler (DE); Deniz Bienhuls, Windhagen (DE); Christoph Mehren, Konigswinter (DE); Robert Lower, Rheinbach (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 933 days.

(21) Appl. No.: 11/772,932

(22) Filed: Jul. 3, 2007

(65) Prior Publication Data
US 2008/0006625 A1 Jan. 10, 2008

Related U.S. Application Data (60) Provisional application No. 60/806,487, filed on Jul. 3, 2006.

(51) Int. Cl.
*B29C 65/44* (2006.01)
*B29C 65/64* (2006.01)
(Continued)

(52) U.S. Cl.
CPC ....... *B60K 15/03177* (2013.01); *B29C 49/0047* (2013.01); *B29C 49/20* (2013.01); *B29C 51/12* (2013.01); *B29C 51/267* (2013.01); *B29C 65/028* (2013.01); *B29C 65/605* (2013.01); *B29C 65/609* (2013.01); *B29C 65/7838* (2013.01);
(Continued)

(58) Field of Classification Search
None
See application file for complete search history.

(56) References Cited

U.S. PATENT DOCUMENTS 2,300,594 A 11/1942 Rehfeld
3,074,292 A * 1/1963 Polmon ............................ 74/553
(Continued)

FOREIGN PATENT DOCUMENTS

DE 19600872 7/1997
DE 19730800 1/1999
(Continued)

OTHER PUBLICATIONS

PCT International Search Report dated Feb. 10, 2006 received in corresponding PCT Application No. PCT/EP06/12152, 5 pgs.

*Primary Examiner* — Edmund H. Lee
(74) *Attorney, Agent, or Firm* — Grossman Tucker Perreault & Pfleger, PLLC (57) ABSTRACT

The invention concerns a process for the production of an article enclosing built-in fitment components in the form of a hollow body of thermoplastic material. The hollow body is preferably in the form of a fuel tank. The process includes the extrusion of one or more preforms in web or tube form of plasticized material between the opened portions of a mold tool forming a cavity, wherein at least one built-in fitment component to be enclosed by the finished article is placed between the portions of the mold tool and the tool is closed around the preforms and the built-in fitment component, wherein the preforms within the cavity enclosed by the tool acquire the external configuration of the article. The built-in fitment component is pressed during or directly after the shaping operation against the inside wall of the article while still plastic so that the plastic material of the hollow body penetrates through at least one recess or opening of the built-in fitment component and flows therebehind.

13 Claims, 7 Drawing Sheets

(51) Int. Cl.
    *B29C 49/20*     (2006.01)
    *B29C 51/26*     (2006.01)
    *B29C 65/02*     (2006.01)
    *B29C 65/00*     (2006.01)
    *B60K 15/03*     (2006.01)
    *B29C 49/00*     (2006.01)
    *B29C 51/12*     (2006.01)
    *B29C 65/60*     (2006.01)
    *B29C 65/78*     (2006.01)
    *B29K 101/12*     (2006.01)
    *B29L 22/00*     (2006.01)
    *B29L 31/00*     (2006.01)
    *B60K 15/077*     (2006.01)

(52) U.S. Cl.
    CPC ............... *B29C 66/532* (2013.01); *B29C 66/54* (2013.01); *B29C 66/83221* (2013.01); *B29C 2049/0057* (2013.01); *B29C 2791/001* (2013.01); *B29K 2101/12* (2013.01); *B29L 2022/00* (2013.01); *B29L 2031/7172* (2013.01); *B60K 2015/03032* (2013.01); *B60K 2015/03453* (2013.01); *B60K 2015/0777* (2013.01)

(56) References Cited

U.S. PATENT DOCUMENTS

| | | | |
|---|---|---|---|
| 3,261,909 A * | 7/1966 | Rust et al. | 174/153 R |
| 3,281,283 A * | 10/1966 | Ralph | 29/623.2 |
| 3,308,225 A * | 3/1967 | Wells | 264/249 |
| 3,458,618 A | 7/1969 | Burns et al. | |
| 3,935,631 A * | 2/1976 | Doerner | 29/432.1 |
| 4,911,878 A | 3/1990 | Hopperdietzel | |
| 4,952,347 A | 8/1990 | Kasugai | |
| 5,308,427 A | 5/1994 | Duhaime et al. | |
| 5,405,467 A * | 4/1995 | Young et al. | 156/91 |
| 5,445,783 A * | 8/1995 | Irish et al. | 264/515 |
| 5,514,323 A * | 5/1996 | Ramioulle | 264/516 |
| 6,338,420 B1 | 1/2002 | Pachciarz et al. | |
| 6,814,921 B1 | 11/2004 | Van Schaftingen et al. | |
| 6,840,755 B1 | 1/2005 | Cook | |
| 7,166,253 B2 * | 1/2007 | Van Schaftingen et al. | 264/515 |
| 7,290,675 B2 * | 11/2007 | Gombert et al. | 220/562 |
| 7,431,452 B2 * | 10/2008 | Sheldon | 351/154 |
| 2002/0189797 A1 | 12/2002 | Moitzheim | |
| 2004/0090088 A1 | 5/2004 | Reed et al. | |
| 2005/0284872 A1 | 12/2005 | Gombert et al. | |
| 2006/0022381 A1 | 2/2006 | Brozenick et al. | |
| 2006/0102634 A1 * | 5/2006 | Potter et al. | 220/562 |

FOREIGN PATENT DOCUMENTS

| | | | |
|---|---|---|---|
| EP | 0103832 | | 3/1984 |
| EP | 1329302 A1 | | 7/2003 |
| EP | 1484173 | | 12/2004 |
| GB | 1293431 | | 10/1972 |
| GB | 2051661 | | 1/1981 |
| WO | WO 2006/008308 | * | 1/2006 |
| WO | WO2006/008308 | | 10/2006 |

\* cited by examiner

METHOD FOR PRODUCING A CONTAINER OF THERMOPLASTIC MATERIAL

CROSS-REFERENCE TO RELATED APPLICATIONS

This application claims priority to U.S. Provisional Application 60/806,487 filed Jul. 3, 2006.

FIELD

The invention concerns a process for the production of a plastic hollow body and a plastic container.

BACKGROUND

A very wide range of different production processes are known for the production of hollow bodies of thermoplastic material, for example extrusion blow molding, deep drawing or injection molding. In the extrusion blow molding process the hollow body can be seamlessly produced for example from a single tubular preform. It will be noted that there is also the possibility of dividing up a tubular preform in respect of length into webs, placing the webs separately in a two-part or multi-part tool and expanding or shaping the webs within the tool by means of a reduced pressure or by the action of gas pressure.

Particularly in the production of technical components such as fuel tanks which are produced in the above-described manner in one or more parts from thermoplastic material, it is necessary for various built-in fitment components or attachments to be fixed to the hollow body. That can be effected in the first heat in the production procedure or also subsequently. If the hollow body is intended to accommodate the built-in fitment components in its interior, it is frequently necessary, because of the size of those components, for them to be introduced into the hollow body in the production of the latter. The built-in fitment components and attachments which are to be installed or attached can be clipped or welded to the hollow body, in which case the welding operation can be effected in production of the hollow body in the first heat or subsequently in the second heat, for example by friction welding or welding with a heat reflector.

Limits are often imposed on positively locking anchorage of a built-in fitment component in the interior of the hollow body, by virtue of the process for the production thereof. For example, when producing hollow bodies by an extrusion blow molding process, it is only limitedly possible to provide in the contour of the hollow body undercut configurations which permit built-in fitment components to be locked to the wall of the hollow body in positively engaging relationship. For that reason recourse is frequently had to welding as the joining procedure.

However welding the components together suffers from the disadvantage that the plastic materials to be joined must form a mutually weldable material pairing. That limits the choice of the built-in fitment components or attachments for the hollow body.

By way of example in the production of fuel tanks of plastic material that can represent a far-reaching limitation as certain plastic materials, in the presence of fuel, are sources or are permeable for hydrocarbons. Therefore for certain conduits and valves it is necessary to choose a material which from the outset excludes the possibility of welding to the tank or the hollow body.

Therefore the object of the invention is to provide a process for the production of an article enclosing built-in fitment components in the form of a hollow body of thermoplastic material, which permits particularly simple and secure fixing of built-in fitment components in the hollow body in the course of the production thereof.

A further object of the invention is to provide a plastic hollow body to which built-in fitment components or attachments are joined in positively locking relationship in a particularly simple fashion.

SUMMARY

The object is firstly attained by a process for the production of an article enclosing built-in fitment components in the form of a hollow body of thermoplastic material, in which one or more preforms in web or tube form of plasticized material are placed between the opened portions of a mold tool forming a cavity, at least one built-in fitment component to be enclosed by the finished article is placed between the portions of the mold tool and the tool is closed around the preforms and the built-in fitment component and the preforms within the cavity enclosed by the tool acquire the external configuration of the article, wherein the built-in fitment component is pressed during or directly after the shaping operation against the inside wall of the article while still plastic so that the plastic material of the hollow body penetrates through at least one recess or opening of the built-in fitment component and flows therebehind.

In that way it is possible to provide for positively locking anchorage of the built-in fitment component to the wall of the hollow body with comparatively simple means. The inside wall of the hollow body passes through and flows behind an anchorage opening in the built-in fitment component so that, after the components have cooled, the result obtained is a positively locking non-detachable join. There is no need for compatibility of the materials in the sense of weldability of the parts. The built-in fitment component can also comprise for example metal or another material.

Due to the configuration of the opening of the fitment component, the material of the wall of the hollow body, which flows through that opening into the fitment component, preferably constitutes a head which holds the join similarly to a rivet head.

In a preferred variant of the process, the operation of pressing the built-in fitment component against the inside wall of the article is effected without lost aids which for example after the article is finished have to be removed therefrom again.

In a particularly preferred variant of the process according to the invention the head of the join is produced without aids for producing a change in direction (restraining the plastic material of the wall of the hollow body, which flows into the opening).

Desirably two preforms in web form are extruded between the opened halves of a two-part blow molding mold, wherein the mold halves are firstly closed against a fitment carrier frame arranged between them, arranged within the fitment carrier frame are means for the positioning of built-in fitment components, with which the built-in fitment component is pressed out of the plane of the frame against the inside wall of the article, and wherein in a further step in the process the fitment carrier frame is removed and the mold halves are closed against each other to finish the article. With the latter step in the process welding of the two halves of the article is achieved while still in the first heat.

It is readily apparent to the man skilled in the art that, instead of a fitment carrier frame, it is also possible to provide a fitment carrier plate. In addition the fitment carrier frame does not necessarily have to be in the form of an open or opened element.

The object of the invention is further attained by a plastic hollow body having at least one built-in fitment component or attachment which was joined to the hollow body in the production thereof, wherein the hollow body and the built-in fitment component or attachment are positively lockingly joined together in such a way that the built-in fitment component or attachment has at least one through opening in the region of its contact surface with the wall of the hollow body, the plastic material of the wall of the hollow body passing through and engaging behind the through opening.

The through opening is desirably in the form of a circular round bore. Alternatively the through opening can be profiled, which is advantageous in particular when the built-in fitment component has only one through opening and a unique orientation of the fitment component in relation to the wall of the hollow body is wanted. Preferably the plastic material which passes through the through opening, in the built-in fitment component or attachment, forms an enlarged head which provides for positively locking anchorage of the two component parts.

In accordance with a preferred variant of the plastic hollow body according to the invention it is provided that the built-in fitment component has at least one foot element which forms a stepped or shouldered contact surface with the wall of the hollow body. In that way the pressure in relation to area against the wall of the hollow body is increased in the region of the contact surface, with the pressing force remaining the same. The foot element or elements produce a ram-like action which boosts the flow of the thermoplastic material of the wall of the hollow body into the through opening. Desirably the through opening passes through the contact surface of the foot element.

In a variant of the plastic hollow body it is provided that the contact surface is of a concave or conical configuration and the through opening forms approximately the deepest location of the hollow, whereby the flow movement of the plastic material of the wall of the hollow body through and behind the through opening is positively influenced.

In a further advantageous configuration of the plastic hollow body it is provided that the through opening is of an undercut configuration at its end remote from the wall of the hollow body. The undercut configuration forms the support for the enlarged head of the projection formed by molten material when it has cooled down.

If the plastic hollow body according to the invention is for example in the form of a fuel tank, then built-in fitment components of the fuel tank can be provided with a plurality of foot elements in the above-described manner. Thus, increasing the number and distribution of the join locations makes it possible to achieve a join or anchorage, which is secure for any operating condition of the vehicle, for the fitment components in the interior of the fuel tank.

DESCRIPTION OF THE DRAWINGS

The invention is described hereinafter by means of an embodiment by way of example illustrated in the drawings in which.

DETAILED DESCRIPTION

Figure 1:
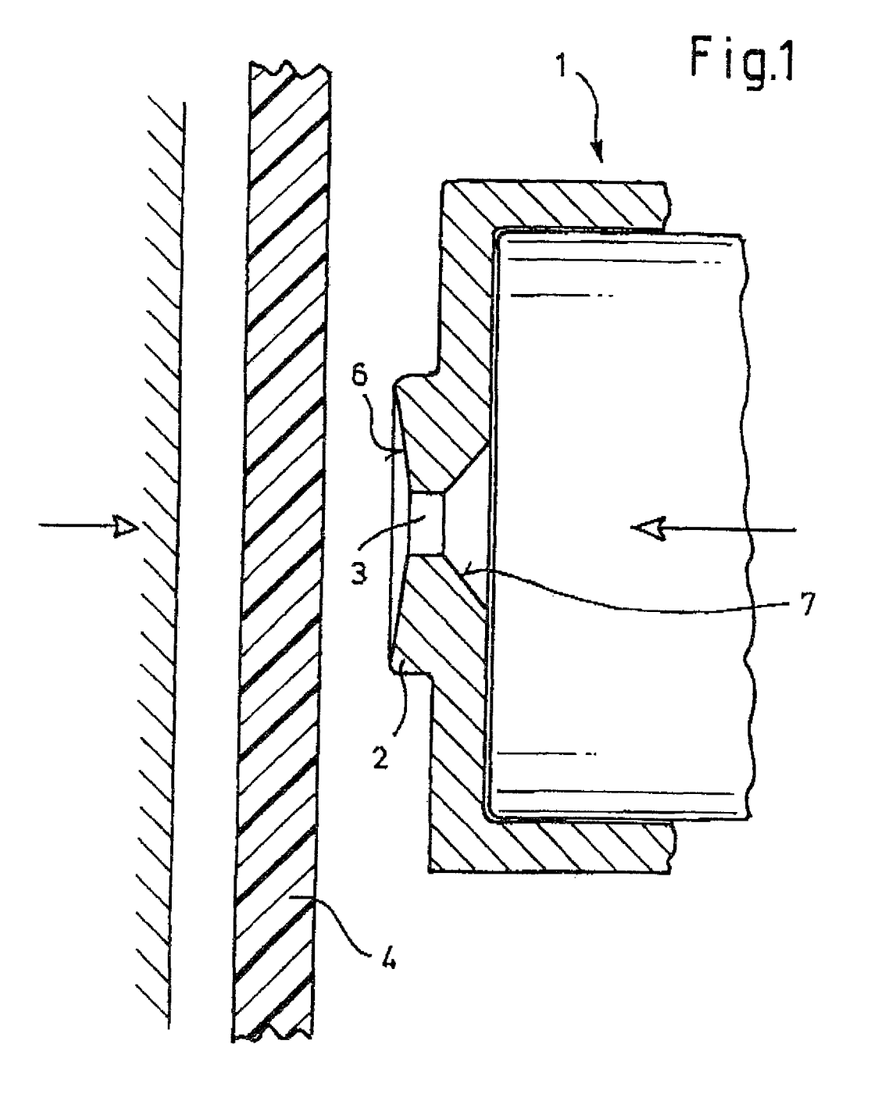
FIGS. 1 and 2 are diagrammatic views of the join of a built-in fitment component to the wall of the hollow body.
Figure 2:
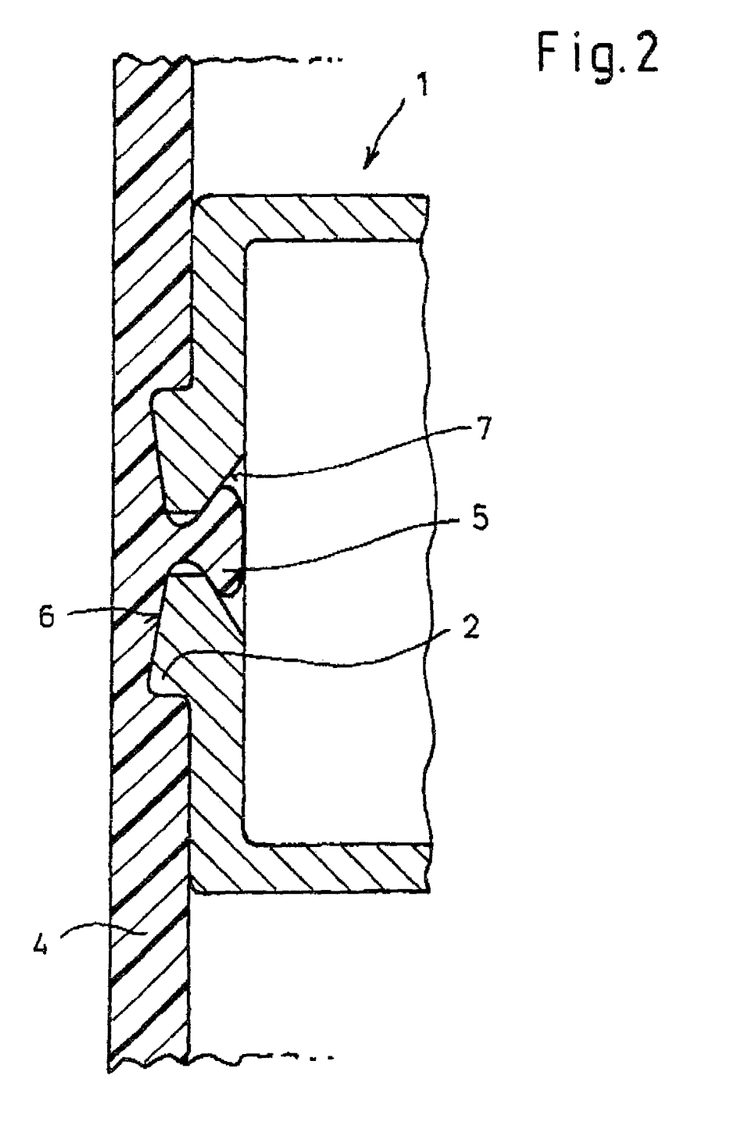
Figure 3:
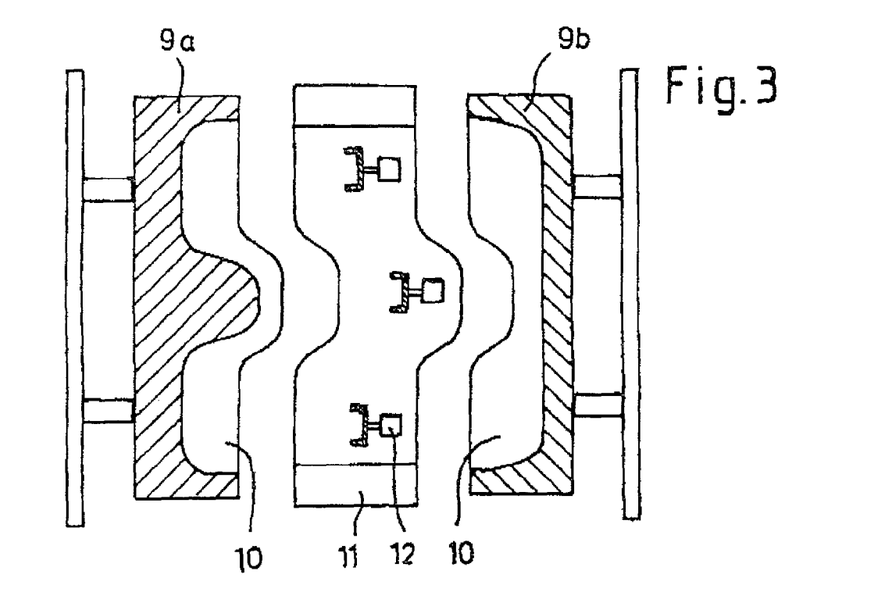
FIGS. 3 through 12 are diagrammatic views of the production process for a fuel tank of plastic material according to the invention.

As shown in greatly simplified form in FIGS. 1 and 2 the built-in fitment component 1 which is shown in section has a foot element 2 with a through opening 3.

As already mentioned hereinbefore the process according to the invention is described hereinafter by way of example with reference to the production of a fuel tank of plastic material. The invention however is to be so interpreted that any hollow body can be produced. The join can be implemented both within and also outside the hollow body. In the present case the built-in fitment component 1 is in the form of a surge pot in a fuel tank.

The built-in fitment component 1 shown in FIG. 1 is pressed with its foot element 2 against the wall 4 of the hollow body to be produced, more specifically when the plastic material of the wall 4 is still or again in the plastic state. In the production process described hereinafter, the join is made in the first heat in production of the hollow body so that the material of the wall 4 is still in the molten state and, when sufficient pressure is applied to the foot element 2 in the direction of the arrow shown at the right in FIG. 1, the material of the wall forms the head 5 shown in FIG. 2, which engages behind the through opening 3 in the fitment component 1. The through opening 3 is preferably in the form of a circular round bore which is beveled or undercut at its end remote from the wall 4.

For the purposes of improving the flow characteristics of the material which is in the plastic state the foot element 2 has a concave contact surface 6 through which the through opening 3 passes centrally, that is to say at the deepest location of its hollow curvature. That configuration of the contact surface 6 and the foot element 2 which is stepped in relation to the fitment component 1 advantageously affects the flow characteristics of the molten material through the through opening 3. The ram-shaped, stepped configuration of the foot element 2 increases the pressure in relation to surface area in the region of the contact surface, with a given pressing force. The concave configuration of the contact surface in conjunction with the increased pressure in relation to surface area which occurs there provides that the molten material is guided into the through opening 3.

On its side remote from the contact surface 6 the through opening 3 is provided with an undercut configuration 7 which serves as a support for the head 5. (See FIG. 2.) The latter is formed even if the undercut configuration 7 is not present, then it is necessary under some circumstances for the thickness of the foot element 2 to be selected as less.

As already mentioned hereinbefore the process according to the invention is illustrated diagrammatically in FIGS. 3 through 12.

The process according to the invention includes the production of the article 8 in the form of a fuel tank by extrusion blow molding.

Figure 4:
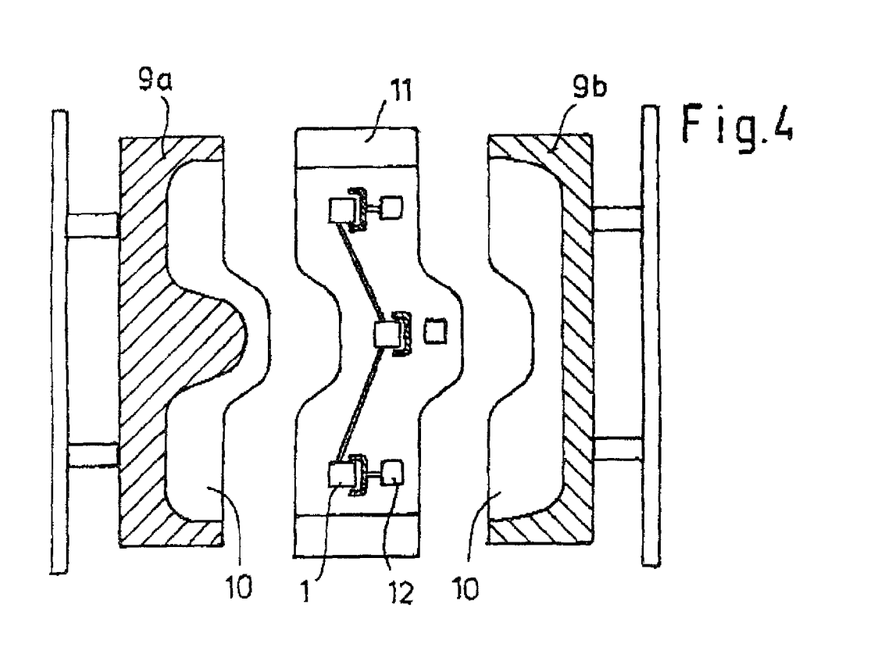

The mold tool comprises two mold halves 9a, 9b which are of a mutually complementary configuration and which in the closed condition define a mold cavity 10 which determines the external configuration of the article 8 to be finished. Placed between the mold halves 9a, 9b is a fitment carrier frame 11 which is arranged displaceably between the mold halves 9a, 9b. Fitment component holders 12 are arranged variably in position within the fitment carrier frame 11. The holders 12 are displaceable or movable within the fitment carrier frame 11 hydraulically or pneumatically in the plane of the fitment carrier frame and transversely relative thereto. As shown in FIG. 4 the holders 12 are equipped with fitment components 1. In the present case the fitment components 1 are connected together by way of a conduit (no identified in greater detail). Each of the fitment components is approximately of the configuration shown in FIGS. 1 and 2.

After the fitment carrier frame 11 has been positioned between the mold halves 9a, 9b, preforms 13 in web form are extruded from one or more extrusion heads (not shown), between the opened mold halves 9a, 9b. It is equally possible for the preforms 13 not to be extruded at the place at which the tool is disposed but remote therefrom and to be moved to a position between the opened mold halves 9a, 9b with a handling apparatus.

Figure 5:
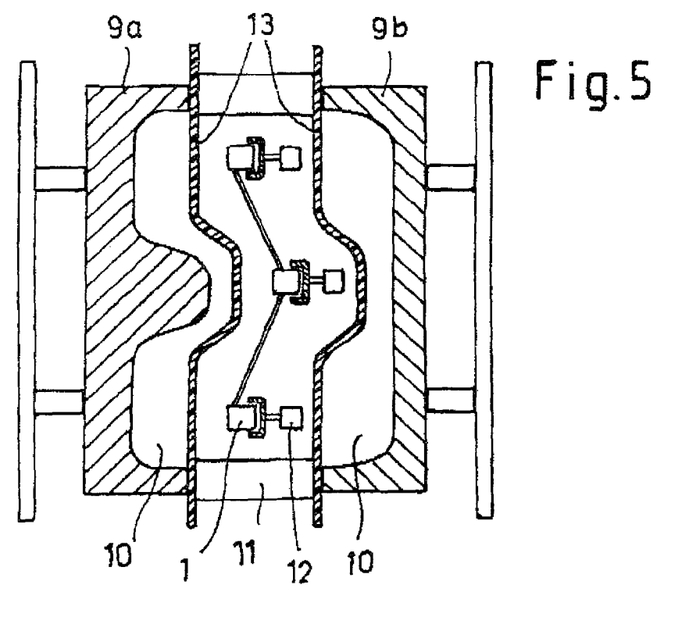
Figure 6:
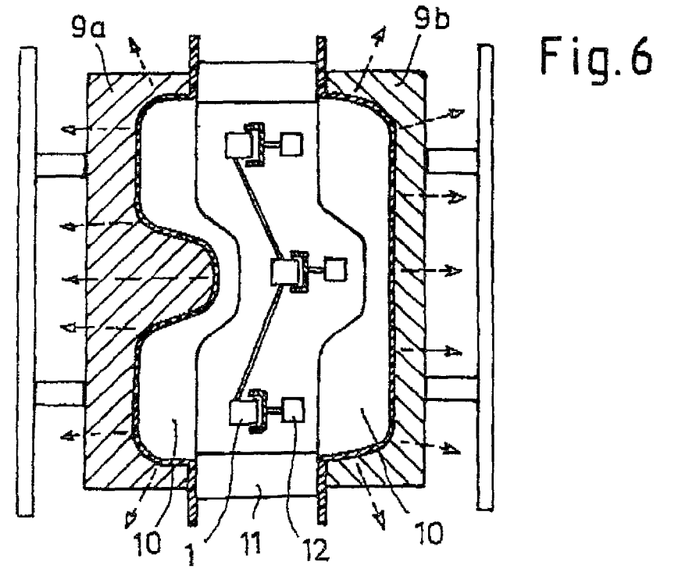
Figure 7:
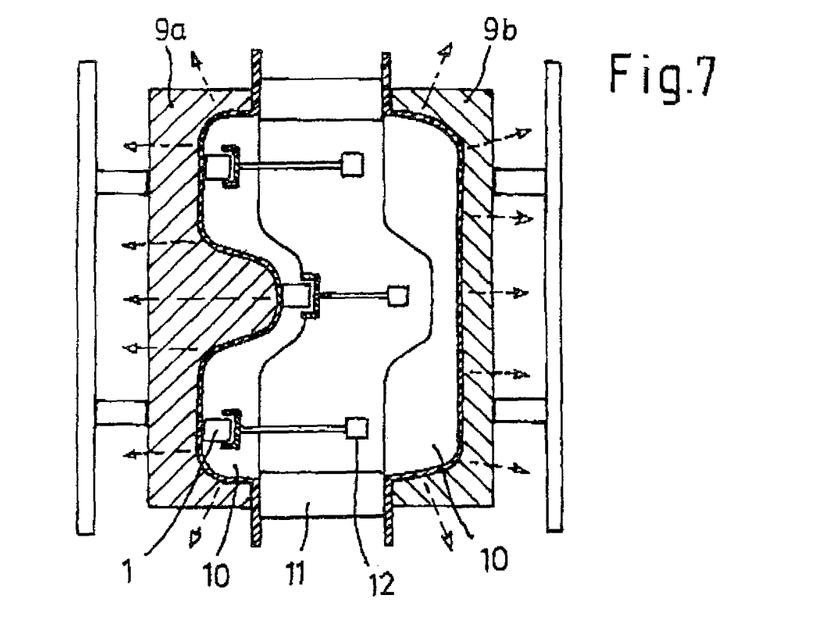
Figure 8:
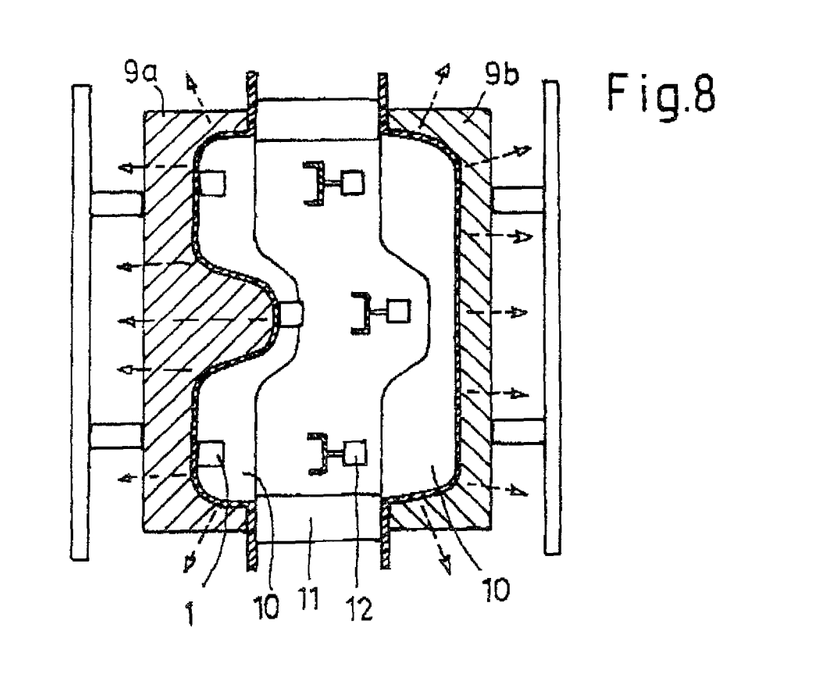
Figure 9:
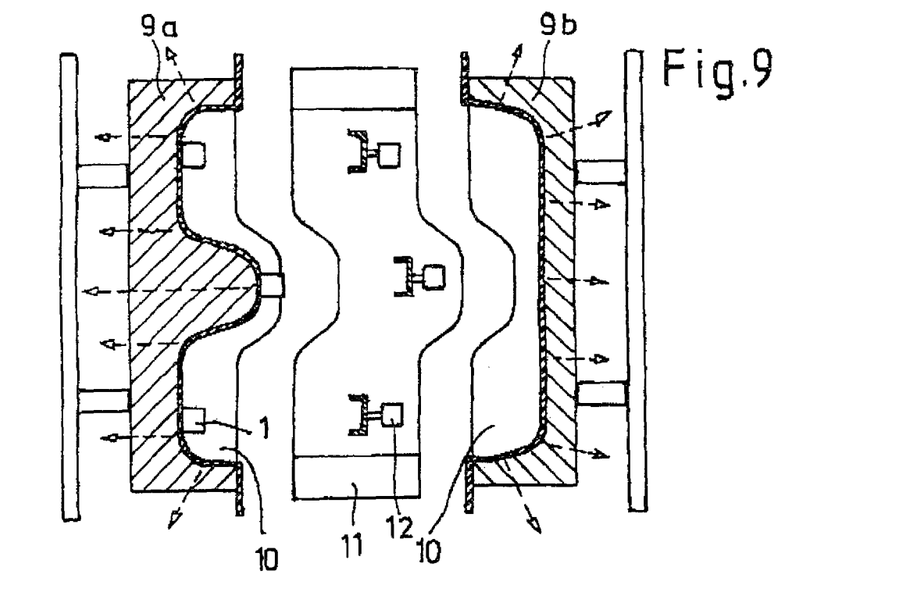
Figure 10:
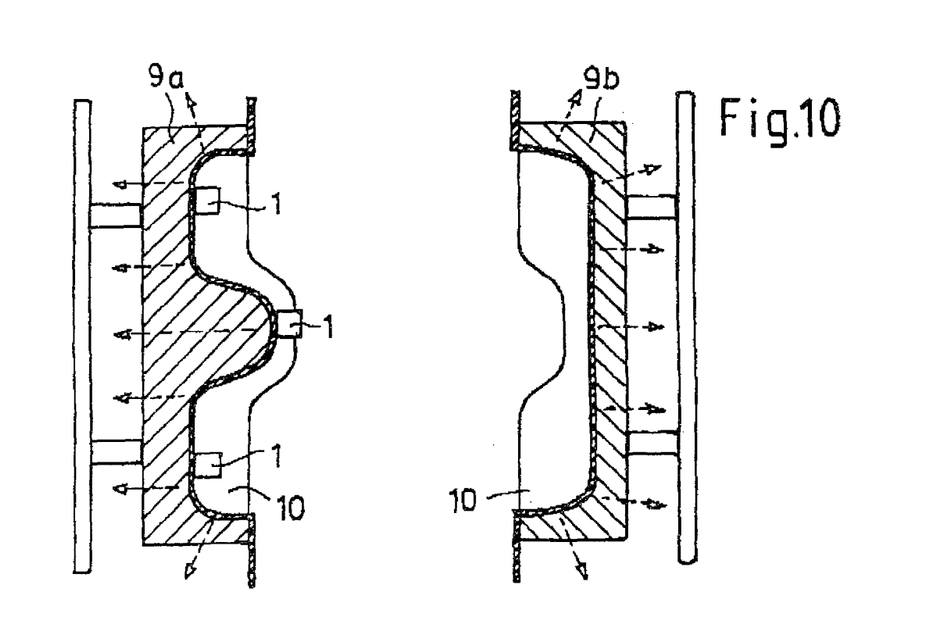

The preforms 13 extend in the position shown in FIGS. 5 and 6 between a respective mold half 9a, 9b and the fitment carrier frame 11. In a further step in the process the preforms are applied against the contour of the mold halves 9a, 9b in the mold cavity 11 by means of a reduced pressure. That can be effected with closure of the mold halves 9a, 9b against the fitment carrier frame 11 or can already have been effected previously.

The preforms 13 are caused to bear completely against the contour of the mold cavity 10 by means of reduced pressure or also increased pressure.

The component holders 12 then move out of the plane of the frame and press the fitment components 1 against the wall 4 of the article 8 or against the preforms which are bearing against the mold cavity 10. (See FIG. 7.) The above-described anchorage of the fitment components 1 to the wall 4 of the article 8 takes place accordingly.

The fitment component holders 12 then move back into their starting position. (See FIG. 8.) The mold halves are moved away from each other, with the previously formed half-shell portions of the article 8 remaining in the mold cavity. (See FIG. 9.) The fitment carrier frame 11 is moved away between the mold halves 9a, 9b, (See FIG. 10.) the tool closes again and welds the two half-shell portions of the article together.

Figure 11:
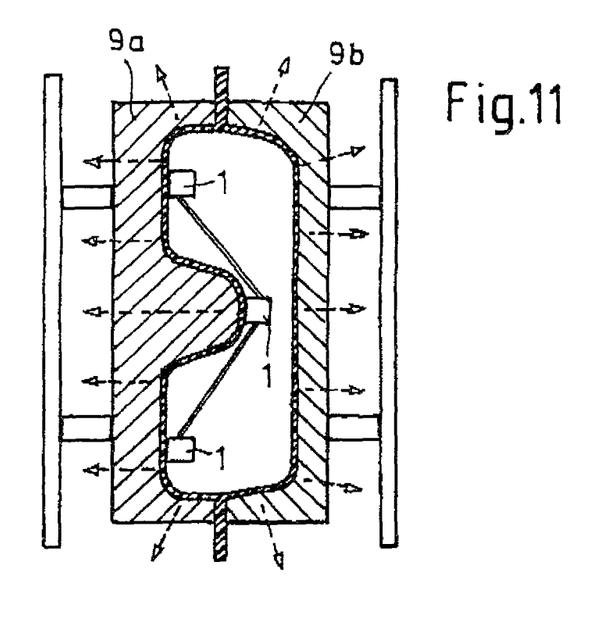
Figure 12:
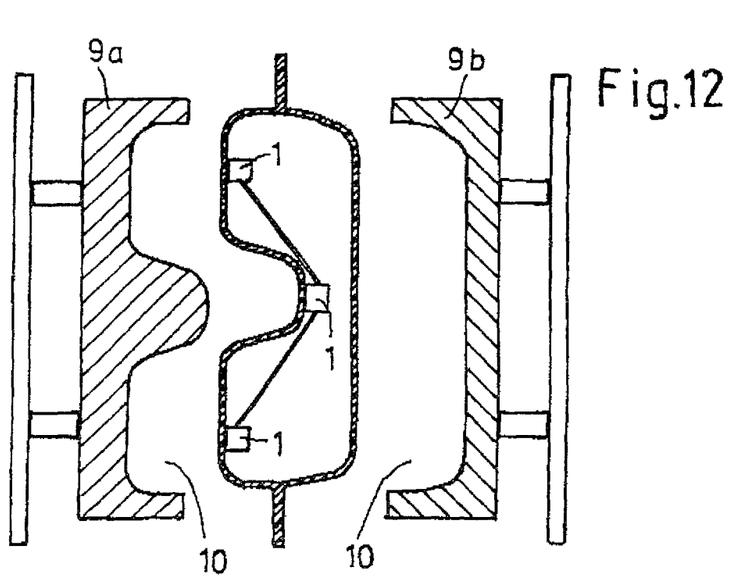

The operations of shaping and removing the finished article 8 are diagrammatically shown in FIGS. 11 and 12.

The invention claimed is:

1. A process for the production of an article enclosing at least one built-in fitment component wherein the article is in the form of a hollow body of thermoplastic material, comprising:
   a) extruding at least one preform in web or tube form of plastic material between opened portions of a mold tool forming a cavity, said at least one preform having an inside wall;
   b) placing at least one built-in fitment component to be enclosed by the article between the portions of the mold tool, said at least one built-in fitment component including a foot element having a stepped configuration which forms a stepped contact surface which contacts said inside wall of said at least one preform, said stepped configuration including at least one through opening through the stepped configuration and into the fitment component, wherein the foot element has a concave surface within the stepped configuration arranged to guide the plastic material to flow through said at least one through opening and an undercut region facing away from said inside wall of said at least one preform, said undercut region comprising a concave surface;
   c) closing the mold tool portions around the at least one preform and the at least one built-in fitment component;
   d) shaping the at least one preform within the cavity enclosed by the tool to form an external configuration of at least a portion of the article; and
   e) pressing the built-in fitment component during or directly after the shaping operation against the inside wall of the at least one preform while said at least one preform is still plastic in the first heat so that the plastic material of the at least one preform is guided into said at least one through opening by said concave surface and flows through said at least one through opening of the foot element and forms a head without aids to restrain the flow of plastic material of the at least one preform, wherein said head is larger than a portion of said at least one through opening and fills at least a portion of said undercut region, which positively lockingly joins the fitment component to the at least one preform.

2. A process as set forth in claim 1 wherein in e) the operation of pressing the built-in fitment component against the inside wall of the preform is effected without lost aids.

3. A process as set forth in claim 1 wherein in a) two preforms in web form are extruded between the opened portions of a two-part blow molding mold tool, and in
   c) wherein the mold tool portions are closed against a fitment carrier frame arranged between them, said fitment carrier frame including means for the positioning of said at least one built-in fitment component, and
   wherein, in a further step in the process, the mold tool portions are moved away from one another, the fitment carrier frame is removed from between the mold tool portions and the mold tool portions are closed against each other to finish the article.

4. A process as set forth in claim 1 wherein the concave surface of the foot element is conical.

5. A process as set forth in claim 1 wherein the concave surface of the undercut region is conical.

6. A process for the production of an article enclosing at least one built-in fitment component wherein the article is in the form of a hollow body of thermoplastic material, comprising:
   a) extruding at least one preform in web or tube form of plastic material between opened portions of a mold tool forming a cavity, said at least one preform having an inside wall;
   b) placing at least one built-in fitment component to be enclosed by the article between the portions of the mold tool, said at least one built-in fitment component including a foot element having a stepped configuration which forms a stepped contact surface which contacts said inside wall of said at least one preform, said stepped configuration arranged to increase a flow of the plastic material through at least one through opening in the fitment component and guide the plastic material to flow through said at least one through opening to an undercut region facing away from said inside wall of said at least one preform;
   c) closing the mold tool portions around the at least one preform and the at least one built-in fitment component;
   d) shaping the at least one preform within the cavity enclosed by the tool to form an external configuration of at least a portion of the article;
   e) pressing the built-in fitment component during or directly after the shaping operation against the inside wall of the at least one preform while said at least one preform is still plastic in the first heat;
   f) guiding the plastic material to flow through said at least one through opening with the foot element to the undercut region facing away from said inside wall of said at least one preform; and
   g) forming a head with the plastic material which flows through said at least one through opening to the undercut region, wherein said head fills at least a portion of said undercut region and positively lockingly joins the fitment component to the at least one preform.

7. A process as set forth in claim 6 wherein the at least one through opening in the fitment component is through the stepped configuration and into the fitment component.

8. A process as set forth in claim 6 wherein the foot element has a concave surface within the stepped configuration to guide the plastic material to flow through the at least one through opening.

9. A process as set forth in claim 8 wherein the concave surface of the foot element is conical.

10. A process as set forth in claim 6 wherein said undercut region has a concave surface.

11. A process as set forth in claim 10 wherein the concave surface of the undercut region is conical.

12. A process as set forth in claim 6 wherein in e) the operation of pressing the built-in fitment component against the inside wall of the preform is effected without lost aids.

13. A process as set forth in claim 6 wherein in a) two preforms in web form are extruded between the opened portions of a two-part blow molding mold tool, and in c) wherein the mold tool portions are closed against a fitment carrier frame arranged between them, said fitment carrier frame including means for the positioning of said at least one built-in fitment component, and wherein, in a further step in the process, the mold tool portions are moved away from one another, the fitment carrier frame is removed from between the mold tool portions and the mold tool portions are closed against each other to finish the article.

* * * * *